United States Patent
Jaiswal et al.

(10) Patent No.: US 12,501,267 B2
(45) Date of Patent: Dec. 16, 2025

(54) SECURE MESSAGING FRAMEWORK FOR PREVENTING SIM SWAP FRAUD

(71) Applicant: T-Mobile USA, Inc., Bellevue, WA (US)

(72) Inventors: Deepak Jaiswal, Redmond, WA (US); Jason Wayne Hayes, Lynnwood, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 330 days.

(21) Appl. No.: 17/861,148

(22) Filed: Jul. 8, 2022

(65) Prior Publication Data

US 2024/0015515 A1    Jan. 11, 2024

(51) Int. Cl.
| | |
|---|---|
| *H04W 12/126* | (2021.01) |
| *H04W 12/06* | (2021.01) |
| *H04W 4/60* | (2018.01) |
| *H04W 8/20* | (2009.01) |
| *H04W 12/30* | (2021.01) |

(52) U.S. Cl.
CPC ....... *H04W 12/126* (2021.01); *H04W 12/068* (2021.01); *H04W 4/60* (2018.02); *H04W 8/20* (2013.01); *H04W 12/35* (2021.01)

(58) Field of Classification Search
CPC . H04W 12/35; H04W 12/126; H04W 12/068; H04W 8/20; H04W 4/60
See application file for complete search history.

(56) References Cited

U.S. PATENT DOCUMENTS

| | | |
|---|---|---|
| 5,915,225 A | 6/1999 | Mills |
| 6,311,055 B1 | 10/2001 | Boltz |
| 6,470,181 B1 | 10/2002 | Maxwell |
| 6,556,820 B1 | 4/2003 | Le et al. |
| 6,650,891 B1 | 11/2003 | Wierzbitzki et al. |
| 6,745,029 B2 | 6/2004 | Lahtinen et al. |
| 6,925,568 B1 | 8/2005 | Heinonen |
| 6,934,391 B1 | 8/2005 | Linkola et al. |
| 6,993,666 B1 | 1/2006 | Hokkanen et al. |
| 7,003,282 B1 | 2/2006 | Ekberg |
| 7,016,669 B2 | 3/2006 | Aerrabotu et al. |

(Continued)

FOREIGN PATENT DOCUMENTS

| | | |
|---|---|---|
| CN | 1319971 A | 10/2001 |
| CN | 1811807 A | 8/2006 |

(Continued)

*Primary Examiner* — Ellen Tran
(74) *Attorney, Agent, or Firm* — Perkins Coie LLP

(57) ABSTRACT

A telecommunications system is configured to prevent Subscriber Identity Module (SIM) swap scams. The system includes multiple network nodes and a database. When a SIM change occurs for a given phone number, a messaging process is triggered between the network nodes that temporarily sets a flag in the database associated with that phone number. While the flag is set in the database, messages for the phone number are not delivered in a normal manner. Instead, the messages are analyzed by the network for the presence of secure information, such as one-time passwords (OTPs). If a message is determined to be secure by the network, then delivery of the message is blocked, thereby preventing a fraudster from performing SIM swap fraud using the message.

20 Claims, 11 Drawing Sheets

(56) References Cited

U.S. PATENT DOCUMENTS

| | | | |
|---|---|---|---|
| 7,024,211 B1 | 4/2006 | Martin |
| 7,155,243 B2 | 12/2006 | Baldwin et al. |
| 7,353,016 B2 | 4/2008 | Roundtree et al. |
| 7,353,394 B2 | 4/2008 | Marmigere et al. |
| 7,418,252 B2 | 8/2008 | Erskine et al. |
| 7,418,254 B2 | 8/2008 | Boss et al. |
| 7,539,514 B2 | 5/2009 | Shieh et al. |
| 7,574,235 B2 | 8/2009 | Tu |
| 7,640,006 B2 | 12/2009 | Portman et al. |
| 7,720,914 B2 | 5/2010 | Goodman et al. |
| 7,738,896 B2 | 6/2010 | Patel et al. |
| 7,792,974 B2 | 9/2010 | Westman et al. |
| 7,890,083 B2 | 2/2011 | Chandran |
| 7,890,139 B2 | 2/2011 | Laumen et al. |
| 8,001,200 B1 | 8/2011 | Fletcher |
| 8,032,122 B2 | 10/2011 | Sigmund et al. |
| 8,036,707 B2 | 10/2011 | Kumar |
| 8,055,238 B1 | 11/2011 | Gailloux et al. |
| 8,060,139 B2 | 11/2011 | Yaqub et al. |
| 8,090,347 B2 | 1/2012 | Santoro et al. |
| 8,108,002 B2 | 1/2012 | Lin |
| 8,126,120 B2 | 2/2012 | Stifelman et al. |
| 8,131,317 B2 | 3/2012 | Lee |
| 8,145,212 B2 | 3/2012 | Lopresti et al. |
| 8,150,908 B2 | 4/2012 | Izdepski et al. |
| 8,166,524 B2 | 4/2012 | Sentinelli |
| 8,175,622 B2 | 5/2012 | Jiang |
| 8,238,905 B2 | 8/2012 | Jiang |
| 8,266,307 B2 | 9/2012 | Strandell et al. |
| 8,306,191 B2 | 11/2012 | Balasaygun et al. |
| 8,311,532 B2 | 11/2012 | Waller |
| 8,336,111 B2 | 12/2012 | Chen |
| 8,359,008 B2 | 1/2013 | Zhou et al. |
| 8,364,180 B2 | 1/2013 | Harris et al. |
| 8,385,893 B2 | 2/2013 | Gupta et al. |
| 8,458,262 B2 | 6/2013 | Mikan et al. |
| 8,463,234 B2 | 6/2013 | Lee et al. |
| 8,467,824 B2 | 6/2013 | Lin et al. |
| 8,472,946 B2 | 6/2013 | Chan et al. |
| 8,549,594 B2 | 10/2013 | Lin |
| 8,594,628 B1 | 11/2013 | Schroeder et al. |
| 8,611,891 B2 | 12/2013 | Selig et al. |
| 8,613,073 B2 | 12/2013 | Mccann et al. |
| 8,644,840 B2 | 2/2014 | Gupta et al. |
| 8,774,760 B2 | 7/2014 | Ryali et al. |
| 8,787,947 B2 | 7/2014 | Backholm et al. |
| 8,914,065 B2 | 12/2014 | Kim |
| 9,060,278 B2 | 6/2015 | Haughn et al. |
| 9,083,680 B2 | 7/2015 | Marsico |
| 9,215,572 B1 | 12/2015 | Gailloux et al. |
| 9,246,883 B2 | 1/2016 | Holtmanns et al. |
| 9,307,397 B2 | 4/2016 | Poon et al. |
| 9,344,131 B2 | 5/2016 | Kokkonen et al. |
| 9,384,479 B2 * | 7/2016 | Larkin ............... G06Q 20/385 |
| 9,398,458 B2 | 7/2016 | Horn et al. |
| 9,445,274 B2 | 9/2016 | Haberkorn |
| 9,474,105 B2 | 10/2016 | Awoniyi-oteri et al. |
| 9,572,015 B2 | 2/2017 | Marquardt |
| 9,578,498 B2 | 2/2017 | Du et al. |
| 9,609,510 B2 | 3/2017 | Raleigh et al. |
| 9,635,487 B2 | 4/2017 | Rodgers et al. |
| 9,635,542 B2 | 4/2017 | Uhari et al. |
| 9,667,798 B2 | 5/2017 | Witzel |
| 9,686,420 B2 | 6/2017 | Jahr |
| 9,699,627 B2 | 7/2017 | Kwan et al. |
| 9,712,668 B2 | 7/2017 | Arbe et al. |
| 9,723,462 B2 | 8/2017 | Schmit et al. |
| 9,735,821 B2 | 8/2017 | Vecera et al. |
| 9,736,689 B2 | 8/2017 | Liu et al. |
| 9,756,045 B2 | 9/2017 | He et al. |
| 9,781,094 B2 | 10/2017 | Shahidi et al. |
| 9,817,992 B1 | 11/2017 | Paczkowski et al. |
| 9,820,085 B1 | 11/2017 | Telang et al. |
| 9,832,649 B1 | 11/2017 | Curran et al. |
| 9,942,747 B2 | 4/2018 | Dowlatkhah et al. |
| 10,075,848 B2 | 9/2018 | Velusamy et al. |
| 10,117,072 B1 | 10/2018 | Lee et al. |
| 10,117,165 B2 | 10/2018 | Kokkonen et al. |
| 10,805,799 B1 | 10/2020 | Bilger et al. |
| 11,146,944 B1 | 10/2021 | Guru et al. |
| 11,166,151 B2 | 11/2021 | Soryal |
| 11,317,282 B2 * | 4/2022 | Ratnakaram ........... H04W 12/06 |
| 11,861,582 B2 * | 1/2024 | Nagaraja ............... H04W 12/121 |
| 2002/0142753 A1 | 10/2002 | Pecen et al. |
| 2004/0019564 A1 | 1/2004 | Goldthwaite et al. |
| 2004/0038706 A1 | 2/2004 | Wasser |
| 2004/0229601 A1 | 11/2004 | Zabawskyj et al. |
| 2005/0015443 A1 | 1/2005 | Levine et al. |
| 2005/0075106 A1 | 4/2005 | Jiang |
| 2005/0108417 A1 | 5/2005 | Haumont |
| 2005/0152343 A1 | 7/2005 | Rajagopalan |
| 2006/0009243 A1 | 1/2006 | Dahan et al. |
| 2006/0046721 A1 | 3/2006 | Sernan-dez et al. |
| 2006/0269061 A1 | 11/2006 | Balasubramanian et al. |
| 2006/0291455 A1 | 12/2006 | Katz et al. |
| 2007/0060200 A1 | 3/2007 | Boris et al. |
| 2007/0077966 A1 | 4/2007 | Huang |
| 2007/0082705 A1 | 4/2007 | Jain et al. |
| 2007/0091869 A1 | 4/2007 | Kahn |
| 2007/0103317 A1 | 5/2007 | Zellner et al. |
| 2007/0191011 A1 | 8/2007 | Jiang |
| 2007/0213075 A1 | 9/2007 | Jiang |
| 2007/0293216 A1 | 12/2007 | Jiang |
| 2008/0003979 A1 | 1/2008 | Jang et al. |
| 2008/0014990 A1 | 1/2008 | Jain et al. |
| 2008/0051057 A1 | 2/2008 | Bliss |
| 2008/0287150 A1 | 11/2008 | Jiang et al. |
| 2008/0301785 A1 | 12/2008 | Beyer et al. |
| 2009/0011745 A1 | 1/2009 | Cha |
| 2009/0222897 A1 | 9/2009 | Carow et al. |
| 2009/0249443 A1 | 10/2009 | Fitzgerald et al. |
| 2009/0298468 A1 | 12/2009 | Hsu |
| 2010/0009659 A1 | 1/2010 | Netanel et al. |
| 2010/0262541 A1 * | 10/2010 | Wolfowitz ......... G06Q 20/3255 707/769 |
| 2010/0273513 A1 | 10/2010 | Hsu |
| 2011/0112906 A1 | 5/2011 | Pulijala et al. |
| 2012/0108204 A1 | 5/2012 | Schell et al. |
| 2012/0190341 A1 * | 7/2012 | Gupta ................. H04L 63/0853 455/411 |
| 2014/0165170 A1 | 6/2014 | Dmitriev et al. |
| 2015/0038120 A1 * | 2/2015 | Larkin .................. H04W 12/04 455/411 |
| 2016/0021532 A1 | 1/2016 | Schenk et al. |
| 2016/0142398 A1 | 5/2016 | Lin |
| 2016/0164926 A1 | 6/2016 | Zehavi et al. |
| 2016/0309326 A1 | 10/2016 | Lian |
| 2021/0209574 A1 * | 7/2021 | Nagaraja ............. G06Q 20/425 |
| 2021/0211876 A1 * | 7/2021 | Bakshi ............... H04W 12/068 |
| 2021/0359991 A1 * | 11/2021 | Mumick .............. H04W 12/06 |
| 2022/0141669 A1 | 5/2022 | Daumer et al. |
| 2022/0255945 A1 * | 8/2022 | Guan ................... H04L 63/102 |

FOREIGN PATENT DOCUMENTS

| | | |
|---|---|---|
| CN | 1811813 A | 8/2006 |
| CN | 1828651 A | 9/2006 |
| CN | 1859454 A | 11/2006 |
| CN | 101098536 A | 1/2008 |
| CN | 101496059 A | 7/2009 |
| CN | 101552671 A | 10/2009 |
| CN | 101335619 B | 10/2010 |
| CN | 101895513 A | 11/2010 |
| CN | 101064628 B | 2/2011 |
| CN | 101662771 B | 12/2011 |
| CN | 102273239 A | 12/2011 |
| CN | 102523581 A | 6/2012 |
| CN | 103077461 A | 5/2013 |
| CN | 103227977 A | 7/2013 |
| CN | 111836251 A | 10/2020 |
| CN | 112449343 A | 3/2021 |
| DE | 102010020763 A1 | 11/2011 |
| DE | 102020004232 B3 | 8/2021 |
| EP | 0950229 B1 | 1/2001 |

(56) References Cited

FOREIGN PATENT DOCUMENTS

| | | |
|---|---|---|
| EP | 1345403 B1 | 6/2005 |
| EP | 1151625 B1 | 9/2006 |
| EP | 1892983 B1 | 8/2010 |
| EP | 2599268 A1 | 6/2013 |
| EP | 2735174 A2 | 5/2014 |
| EP | 2503758 B1 | 3/2015 |
| EP | 2582115 B1 | 12/2015 |
| EP | 3040922 A1 | 7/2016 |
| EP | 2579630 B1 | 12/2016 |
| JP | 2005080266 A | 3/2005 |
| JP | 2007519266 A | 7/2007 |
| JP | 4364431 B2 | 8/2009 |
| JP | 4443402 B2 | 1/2010 |
| KR | 20050021031 A | 3/2005 |
| KR | 100694159 B1 | 3/2007 |
| KR | 20080024960 A | 3/2008 |
| KR | 101317527 B1 | 10/2013 |
| KR | 101396126 B1 | 5/2014 |
| WO | 0062518 A1 | 10/2000 |
| WO | 0073947 A1 | 12/2000 |
| WO | 03032664 A1 | 4/2003 |
| WO | 2005041600 A1 | 5/2005 |
| WO | 2005125223 A1 | 12/2005 |
| WO | 2007036118 A1 | 4/2007 |
| WO | 2007076705 A1 | 7/2007 |
| WO | 2009065417 A1 | 5/2009 |
| WO | 2010045779 A1 | 4/2010 |
| WO | 2011134200 A1 | 11/2011 |
| WO | 2011153897 A1 | 12/2011 |
| WO | 2012055134 A1 | 5/2012 |
| WO | 2012068792 A1 | 5/2012 |
| WO | 2012119450 A1 | 9/2012 |
| WO | 2013109619 A1 | 7/2013 |
| WO | 2013114092 A2 | 8/2013 |
| WO | 2014062384 A1 | 4/2014 |
| WO | 2014191985 A1 | 12/2014 |
| WO | 2015085940 A1 | 6/2015 |
| WO | 2015127588 A1 | 9/2015 |
| WO | 2015176364 A1 | 11/2015 |
| WO | 2016005795 A1 | 1/2016 |
| WO | 2016050990 A1 | 4/2016 |
| WO | 2016177059 A1 | 11/2016 |
| WO | 2017050098 A1 | 3/2017 |
| WO | 2017054283 A1 | 4/2017 |
| WO | 2017107739 A1 | 6/2017 |
| WO | 2017127019 A1 | 7/2017 |
| WO | 2018045805 A1 | 3/2018 |
| WO | 2021236752 A1 | 11/2021 |

* cited by examiner

SECURE MESSAGING FRAMEWORK FOR PREVENTING SIM SWAP FRAUD

BACKGROUND

A SIM swap scam is a type of account takeover fraud that generally targets a weakness in two-factor authentication (2FA) and two-step verification in which the second factor or step is a text message or call placed to a mobile telephone. The fraud exploits a mobile phone service provider's ability to seamlessly port a phone number to a device containing a different subscriber identity module (SIM). This mobile number portability feature is normally used when a phone is lost or stolen, or a customer is switching service to a new phone.

The scam begins with a fraudster gathering personal details about the victim, either by use of phishing emails, by buying them from organized criminals, or by directly socially engineering the victim.

Armed with these details, the fraudster contacts the victim's mobile telephone provider. The fraudster uses social engineering techniques to convince the telephone company to port the victim's phone number to the fraudster's SIM. This is done, for example, by impersonating the victim using personal details to appear authentic and claiming that they have lost their phone.

Once this happens, the victim's phone will lose connection to the network, and the fraudster will receive all text messages and voice calls intended for the victim. This allows the fraudster to intercept one-time passwords (OTPs) sent to the victim and thus allows them to circumvent many two-factor authentication methods of accounts (e.g., bank accounts, social media accounts, etc.) that rely on text messages or telephone calls. After accessing the victim's accounts, the fraudster may then directly transfer funds from a bank account, extort the rightful owner, or sell accounts on the black market for identity theft.

BRIEF DESCRIPTION OF THE DRAWINGS

Detailed descriptions of implementations of the present invention will be described and explained through the use of the accompanying drawings.

Figure 1:
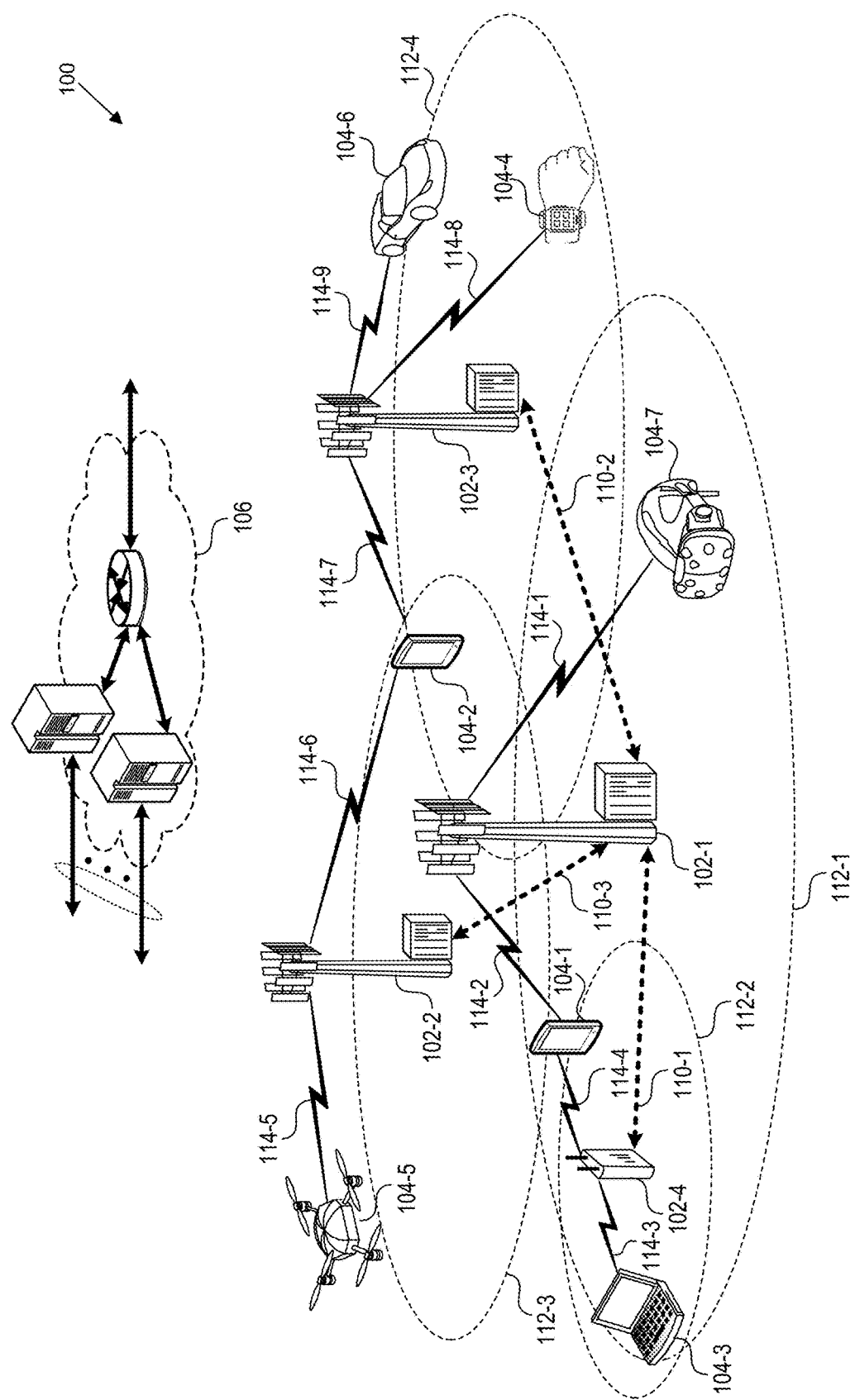
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

A variety of suggestions have been made to protect users against SIM swap fraud. For example, users are often advised to recognize potential phishing attempts by scammers looking to obtain personal information and notify their telephone providers rather than responding to the suspicious messages directly. In addition, users are advised to limit personal information shared online, which reduces the likelihood that an identity thief can obtain the answers to security questions required to verify identity and log into accounts. Finally, additional authentication measures can be implemented for accounts with sensitive personal or financial information. For example, an authentication app that is separate from a user's phone number, such as Google® Authenticator or DUO® Mobile, or a physical security key, can be used to prevent SIM swap scams.

However, many of these methods place the burden of preventing SIM swap fraud on the individual users, who may not be well-versed in technology and modern fraud techniques. Furthermore, methods of fraud are continuously being innovated and refined by scammers. Although it is important for individual users to recognize scams, even vigilant users may expose their personal information, for example as the result of data breaches or other hacks. Because of the ease in which personal information is distributed online, it is important to reduce the burden on users when it comes to preventing fraud.

In addition, SIM swap scams are often completed quickly after performing a SIM change. When a fraudster performs a SIM change to a new device, the previous device generally loses connection to the network, which puts the victim on notice. But following the SIM swap, the fraudster can access accounts, transfer funds, or obtain sensitive information within minutes, for example, by preparing passwords and other account information in advance. As a result, it is often impossible for the victim to contact the network provider and reverse the SIM change without incurring significant losses, even if the victim notices the loss of connection immediately after the SIM change. Thus, effective mechanisms to prevent SIM swap fraud after a SIM change is performed are needed.

The disclosed technology addresses these issues by providing mechanisms to prevent SIM swap fraud, even after a SIM change is initiated. For example, a network provider can implement aspects of the disclosed technology as part of a messaging framework that includes various nodes of the network. When a SIM change is detected, a series of messaging flows are triggered within the network to prevent one-time passwords (OTPs) or other secure messages from being transmitted to malicious actors. For example, preventing OTPs from being transmitted prevents their use by fraudsters seeking to bypass multi-factor authentication (MFA).

First, when a SIM change occurs for a phone number on a network, an associated flag is set in a database. This flag can be configured to expire after a specified period of time, such as 24 hours. While the flag is set, the network monitors text messages, e.g., Short Messaging Service (SMS) messages, routed toward the phone number with the new SIM. When a text message is received at the network, rather than simply deliver the message to the device with the new SIM, a messaging flow is triggered to determine or predict whether the text message includes an OTP. For example, the text message can be transmitted to a node that executes an artificial intelligence model that analyzes text for OTPs.

If the network detects that a particular text message includes an OTP, then delivery of that text message is blocked. Meanwhile, text messages determined not to include an OTP are delivered normally. Setting the flag in the database based on detection of a SIM change improves security of user accounts and devices by providing a mechanism to prevent sensitive information from being transmitted to bad actors, even after an unauthorized SIM change occurs. Temporarily blocking delivery of messages with OTPs, improves security of user accounts by providing enough time to reverse the SIM change before the bad actor can access any of the accounts.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Figure 2:
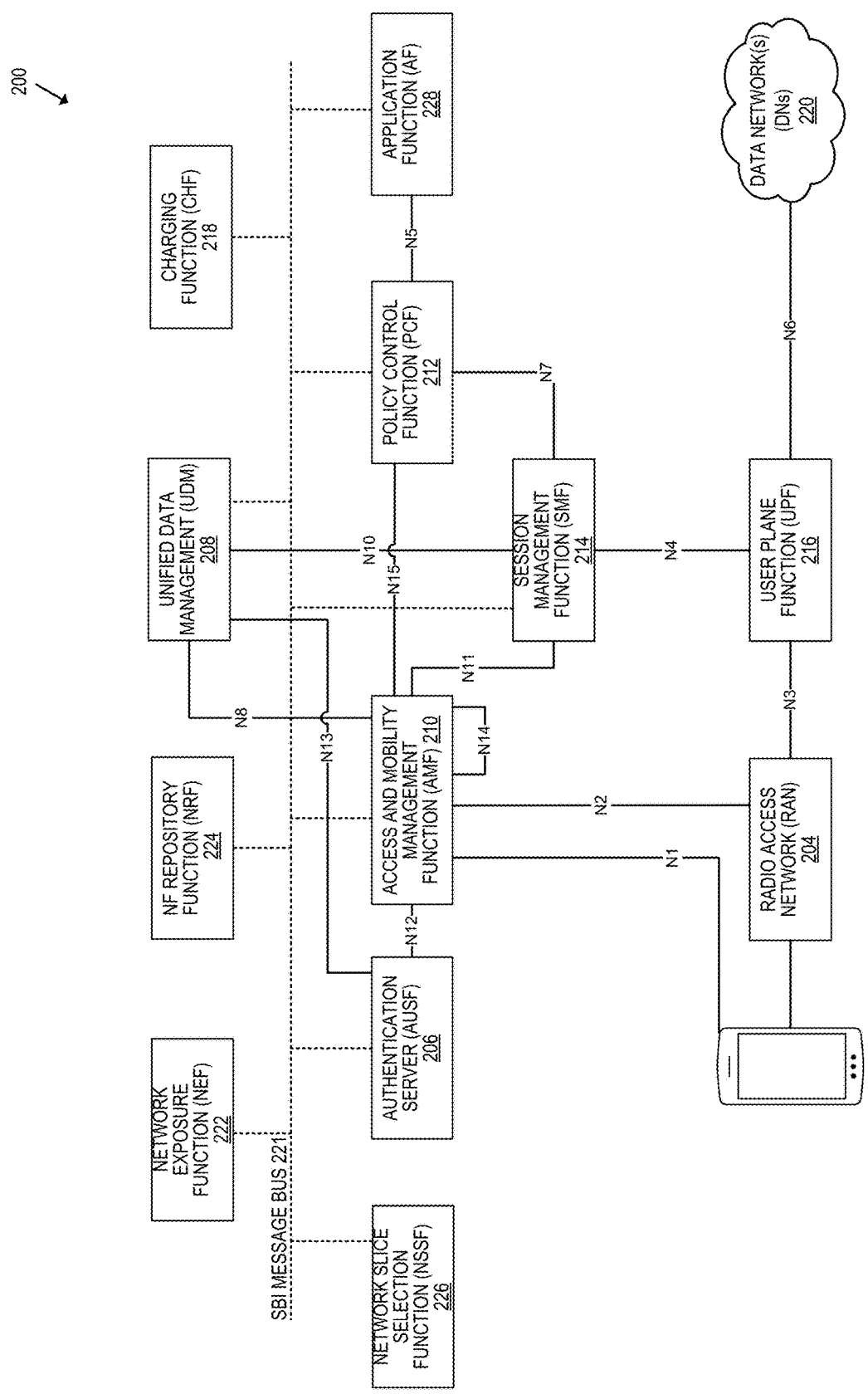
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Secure Messaging Flow

Figure 3:
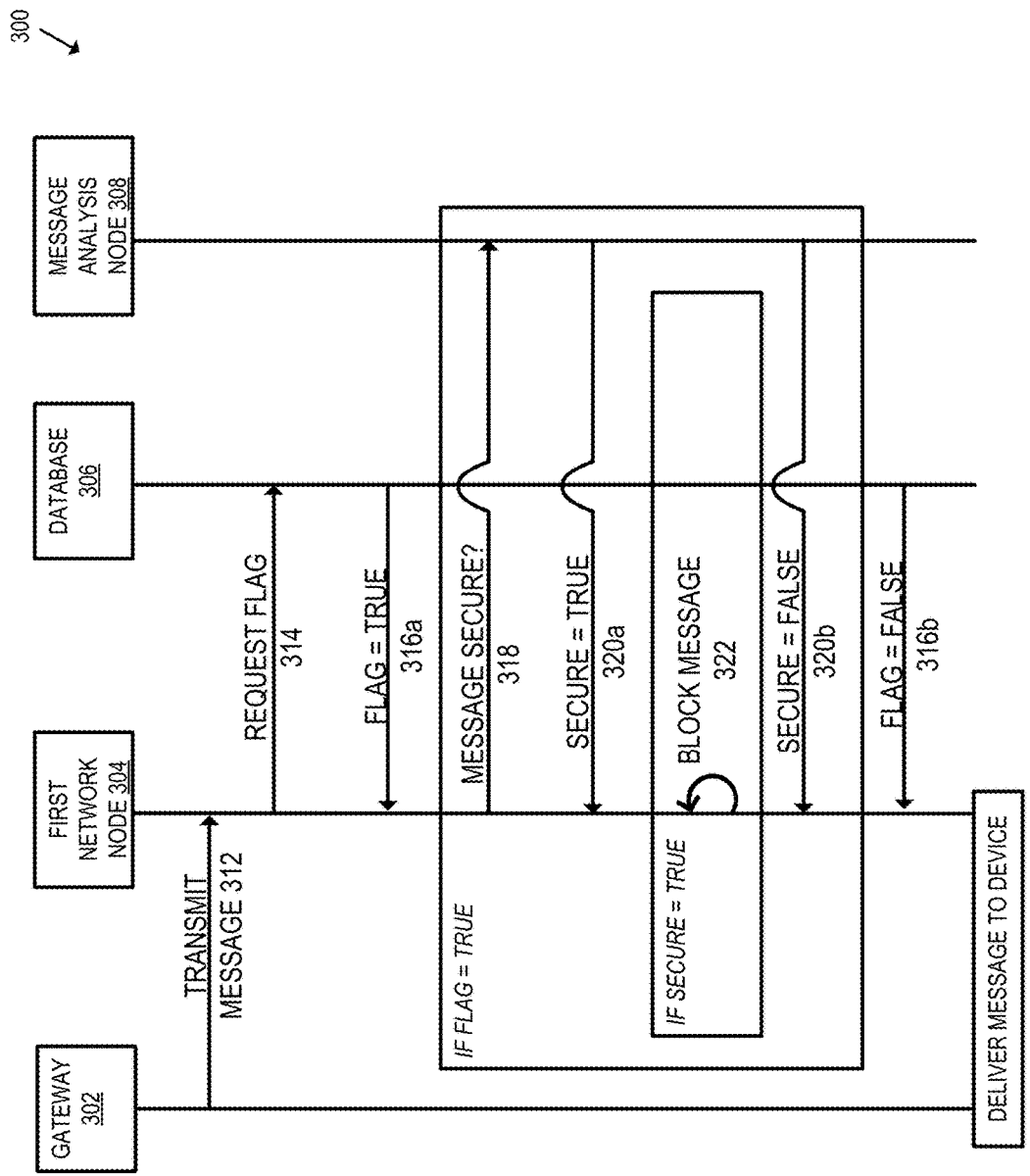
FIG. 3 is a flow diagram that illustrates a signaling process for secure messaging.

FIG. 3 is a flow diagram that illustrates a signaling process 300 for secure messaging. At 312, a message is delivered from a gateway 302 to a first network node 304. The gateway 302 is configured to receive text messages, such as SMS messages, from UEs, that communicate using the network. Other examples of text messages include Multimedia Messaging Service (MMS) messages, Rich Communication Service (RCS), or app-based messages, such as iMessage®, Whatsapp®, WeChat®, etc. In addition to text messages, techniques described in this document can be applied to other forms of messages, such as voice, picture, or video messages. In some implementations, the gateway 302 is a Service Delivery Gateway (SDG) configured to receive a specific type of messaging. For example, the gateway 302 can be configured to receive Application-to-Person (A2P) messages, which are generally sent from an application associated with a business. For example, OTPs associated with 2FA systems are often sent using A2P messaging. The gateway 302 can also be configured to receive messages from different types of phone numbers, such as 5 or 6-digit short codes, 10-digit long codes (10DLCs), etc. For example, A2P messages are often sent from short code numbers, but are also sent using long code numbers. Because most text messages transmitted through a telecommunications network do not include secure information, network resources are conserved by configuring the gateway 302 to receive specific types of messages or messages from a specific type of phone number, rather than receiving all types of messages.

The first network node 304 is configured to perform various messaging operations, such as forwarding, storing, and delivering text messages. In some implementations, the first network node 304 is a Short Message Service Center (SMSC), also referred to as a Short Message Service—Service Center (SMS-SC). The database 306 stores user information, such as phone numbers, device identification numbers, or other identification numbers tied to user accounts. The database 306 can be referred to as a Customer Database (CDB), for users who are customers of a telecommunications network. A flag is set in the database 306 when a SIM change occurs, where the flag is associated with an identification number, such as a phone number, that was transferred during the SIM change. For example, the phone number can be identified by a Mobile Station Integrated Services Digital Network (MSISDN) number. This flag can be set by a customer service representative or an automated system that handles the SIM change. An example implementation of setting the flag is described below with reference to FIG. 4.

At 314, a first request is transmitted from the network node 304 to a database 306. The first request queries the database 306 for the presence of the flag associated with the destination phone number of the message received at 312.

At 316a, a reply is received at the network node 304. The reply at 316a indicates that the flag is set, which indicates to the network node 304 that the message received at 312 should be inspected for security. Alternatively, the reply at 316b indicates that the flag is not set. If the flag is not set, then the network node 304 delivers the message of 312 to the device associated with the destination phone number. If the network node 304 receives a reply that indicates the flag is set in the database 306 at step 316a, then the network node 304 is triggered to initiate an inspection process for the message.

At 318, the message received at 312 is transmitted from the network node 304 to a message analysis node 308. The message analysis node 308 is configured to determine whether the message includes secure content. For example, the message analysis node 308 can be a text processing node that parses and analyzes the text of the message, e.g., for OTPs. In some implementations, the network node 304 can be configured to determine or predict whether the message is secure, such that the message is not transmitted to the separate message analysis node 308 (e.g., if the network does not include a message analysis node 308). In some implementations, both the network node 304 and the message analysis node 308 can contribute to an analysis of the message.

The message analysis node 308 can execute an artificial intelligence (AI) model to determine whether a message is secure. For example, the text of a message can be parsed and then fed into an AI model. The AI model can be implemented using a neural network or other prediction model that is trained using a labeled dataset. For instance, the dataset can include text messages that are pre-labeled to classify whether the messages are "secure" or "not secure." Note that "secure" and "not secure" are merely illustrative labels, and that other words or numbers can be used to classify messages. "Secure" messages include messages with OTPs, verification codes, verification links, or other forms of authentication susceptible to SIM swap attacks. Once trained, the AI model can be used to classify whether a message is secure or not. In some implementations, messages are classified into more than two classes. For example, the AI model can be trained to classify different types of secure messages, such as separately classifying messages with OTPs vs messages with an external verification link. In some implementations, the AI model can be trained to identify different account types associated with incoming text messages, such as differentiating banking account OTPs from lower risk accounts or websites.

In some implementations, the message analysis node analyzes the text and classifies messages using other methods, either to replace or supplement the AI model. For example, the message analysis node can filter messages using a keyword-based approach, such as looking for the terms, "password," "verification," "code," "OTP," "PIN," "access," "authentication," etc. The messages can also be filtered based on the presence of numbers in the body of the text messages, such as 6-digit numbers. The message analysis node can also filter messages by looking for combinations of keywords and/or numbers, which can reduce false positive results compared to single keyword searches. A multi-prong approach is potentially less resource-intensive than using a single AI-based approach without sacrificing accuracy, as not all messages may need to be analyzed using a potentially computation-heavy AI model. Better accuracy in the determination of secure messages results in improved security and reduces the chance that innocuous messages are misclassified. However, accuracy and speed are both important, such that communications over the network are not significantly disrupted or delayed. FIGS. 6A-E display example text messages 600a-e that include OTPs.

In some implementations, the message is analyzed based on a phone number associated with the sender of the message. For example, messages can be classified based on the length of the sender's number. In this example, messages that originate from short code numbers, such as 5 or 6-digit phone numbers, are more likely to include OTPs. Thus, any messages received at the gateway 302 can be coarsely classified as "secure," while messages from long code numbers, such as 10-digit numbers, are classified as "not secure." In some implementations, the message analysis node 308 is configured to reference a "safe list" or "block list" of numbers to determine whether a message is associated with a sender that is likely to send OTPs or other sensitive information. The safe list or block list can be a suitable file, such as a text file, and can be stored at the network node 304, the message analysis node 308, or another network node, such as the database 306.

At 320a, an indication is received at the network node 304 from the message analysis node 308 that the message transmitted at 318 is secure. For example, the indication can indicate to the network node 304 that the message transmitted at 318 includes an OTP. If the indication at 320a indicates the message is secure, then delivery of the message to the device associated with the destination phone number is blocked at 322. In some implementations, at 322, a replacement message is transmitted from the network node 304 to the device associated with the destination phone number. For example, the replacement message can indicate the original message received at the network node 304 at 312 is blocked.

Alternatively, at 320b, an indication is received that the message transmitted at 318 is not secure. For example, the indication can indicate that the message does not include an OTP or other authentication information. If the indication at 320b indicates that the message is not secure, then the network node 304 delivers the message to its intended recipient, the phone number associated with the SIM change. By selectively blocking messages based on these various network components 302-308, sensitive information is protected against SIM swap fraud, while non-sensitive, "not secure" messages, are delivered to users who perform legitimate SIM changes.

Figure 4:
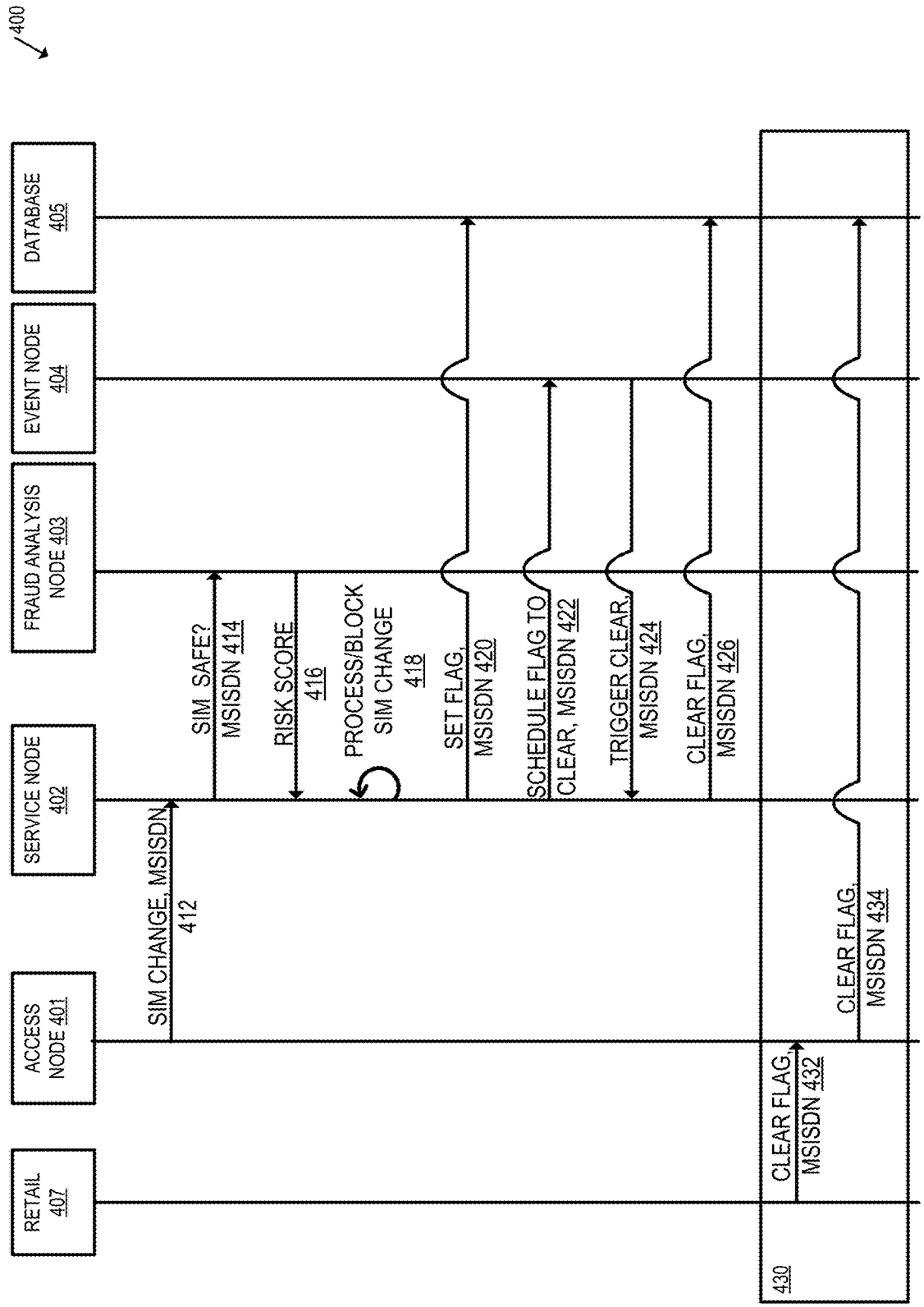
FIG. 4 is a flow diagram that illustrates a signaling process following a SIM change within a network.

FIG. 4 is a flow diagram that illustrates a signaling process 400 that occurs following a SIM change within a network. The process 400 can be used to process the SIM change, block the SIM change, or set the flag that is requested at step 314 of FIG. 3.

At 412, a first message is sent from an access node 401 to a service node 402. The access node 401 can be a Network Access Point (NAP). The first message identifies a phone number and indicates that a SIM change has been requested for that phone number. For example, the phone number can be a MSISDN. The first message can also include identifiers, such as an international mobile subscriber identity (IMSI). During a SIM change, the IMSI associated with a user account can change when the MSISDN is ported to a new SIM, e.g., a new SIM card. The first message can include the new IMSI or the previous IMSI.

At 414, the service node 402 transmits a second message that indicates the SIM change indicated at 412 has been requested to a fraud analysis node 403. The second message includes information associated with the SIM change that is used at the fraud analysis node 403 to determine whether the SIM change is safe. For example, last-seen location information can be included at 414 that indicates the location of the associated mobile device before and/or after the SIM change. Other types of information that can be used include the type of SIM, e.g., electronic SIM (eSIM), device information, or user information.

At 416, the fraud analysis node 403 transmits a third message to the service node 402. The third message indicates a level of risk associated with the SIM change, as determined at the fraud analysis node 403. For example, a SIM change associated with a device upgrade can be determined to be a low risk SIM change. In another example, a SIM change that occurs from a SIM swap scam can be determined to be high risk. The level of risk, or risk score, can be transmitted at 416 as a numerical value, e.g., 1 to 100, or can be transmitted with a non-numerical label, such as "low," "moderate," or "high" risk. Other numerical ranges, labels, or number of labels can be used to indicate the level of risk associated with the SIM change.

The risk score associated with the SIM change transmitted at 416 can be determined using contextual information associated with the SIM change, such as location information or device information associated with the SIM change. For example, a distance between a first device location prior to the SIM change and a second location after the SIM change can be compared to threshold distance values to determine the level of risk. The value and number of threshold distance values can be configured in various ways, though smaller changes in location generally indicate less risk than larger changes in location. Other factors that can be used to determine the risk associated with a SIM change include time zone changes, an amount of time a device is offline during the SIM change, the types of SIM on the device (e.g., eSIM or physical SIM card), changes in device, etc. The fraud analysis node 403 can receive the information associated with the SIM change from the second message at 414, or the fraud analysis node 403 can receive the information from an external node.

In some implementations, a machine learning model can be executed at the fraud analysis node 403 that categorizes SIM changes based on the variety of factors. For instance, the model can be trained by labeled datasets that use known reported SIM swap scams. Results generated from the model can be analyzed and then fed back into the model to refine the model and improve subsequent predictions.

At 418, the service node 402 either processes or blocks the SIM change based on the associated risk score indicated at 416. A SIM change with a high risk score is blocked, while a SIM change with a low or moderate risk score is processed. In some implementations, the distinction between a low or moderate risk score is determined at least partially based on a confidence level.

Because SIM changes with moderate risk scores still have a reasonable likelihood of being associated with SIM swap fraud, the service node 402 initiates a flag setting procedure at 420 configured to temporarily block messages with OTPs. The flag is similar to the flag set in the database 306 of FIG. 3. But when the risk score associated with a SIM change is low or high, then it may not be necessary to initiate the flag setting procedure. Instead, it is likely more efficient to process the SIM change without setting a flag for low risk SIM changes, or directly blocking the SIM change for a high risk SIM change.

The flag setting procedure includes transmitting a fourth message at step 420 from the service node 402 to a database 405. The database 405 is similar to or the same as the database 306 of FIG. 3. The service node 402 also transmits a fifth message at step 422 to an event node 404. The fifth message schedules the event node 404 to automatically transmit a sixth message associated with the phone number at step 424 a predetermined period of time after receiving the fifth message at 422. The fifth message can be transmitted at 422 at approximately the same time as the fourth message is transmitted to the database 405 at step 420.

The flag setting and clearing procedure of steps 420-426 configures a flag in the database 405 to expire at a predetermined time as indicated at step 422. When the process 400 is implemented for the flag used in the process 300 of FIG. 3, this enables the network to temporarily block messages classified as "secure" from being transmitted to devices with new SIMs. Because SIM swap scams often occur during a short period of time after a SIM change, temporarily blocking delivery can effectively prevent a large number of SIM swap scams from occurring. In addition, the processes 300 and 400 can also prevent secure messages from being delivered to devices associated with legitimate SIM changes. Thus, configuring the time period is critical.

The predetermined period of time scheduled at 422 can be configured between approximately 4 to 48 hours. Expiring the flag after a shorter time period can be insufficient to prevent some SIM swap fraud from occurring, while clearing the flag after a longer period of time can prevent users who perform legitimate SIM changes from accessing their accounts for too long. The preferred time range is long enough to prevent SIM swaps, while not being too long as to negatively impact normal communications. In some implementations, the configured time period can be less than about one hour, about 1 to 4 hours, about 4 to 6 hours, about 6 to 12 hours, about 12 to 24 hours, about 24 to 36 hours, about 36 to 48 hours, or greater than about 48 hours.

The predetermined period of time scheduled at 422 can be configured at the service node 402 based on the risk score received at 416. For example, a lower risk score can be correlated with a shorter time period, such as about 1 to 4 hours. A higher risk score can be correlated with a longer time period, such as about 24 to 48 hours. In some implementations, the risk score is expressed as a numerical value, and the predetermined period of time has a linear or proportional relationship with the numerical risk score. By correlating the length of time messages with OTPs are blocked with the risk associated with the SIM change, an appropriate balance between security and user convenience can be reached.

After the time has expired, the event node 404 transmits a sixth message to the service node 402, which triggers the service node 402 to transmit a seventh message to the database 405. Upon receipt of the seventh message, the database 405 clears the flag.

In some implementations, the process 400 includes a manual override procedure 430. The manual override procedure 430 can be used by a network user, a network provider, or third party to clear the flag in the database 405 before the flag is scheduled to expire at 422.

At 432, a message to clear the flag is transmitted from a retail node 407 to the access node 401. In some implementations, the retail node is accessed by a customer service representative, such as in a call center or retail store associated with the network provider. At 434, the message to clear the flag received at 432 is transmitted to the database 405, which then triggers the database 405 to clear the flag.

In some implementations, the manual override procedure 430 is not present or disabled in order to improve security. The manual override procedure 430 can potentially allow malicious third-parties to clear the flag, thereby enabling secure messages to be sent to devices without an account holder's authorization. In some implementations, the manual override procedure 430 is only available to certain third-parties, such as police or other law enforcement. For example, the manual override procedure 430 can be configured to initiate in response to receiving a law enforcement identifier or specifically encrypted message.

A message that is not blocked by a secure messaging procedure, e.g., as shown in FIGS. 3 and 4, is delivered to a user device within the network. In some implementations, users in the network can be classified a barred or an unbarred user. An unbarred user is enabled to receive text messages, whereas a barred user is not permitted by the network to receive text messages. When a message is directed to number associated with a barred user, then the barred user's device can receive a replacement message indicating that the device is barred instead of receiving the original message. In some implementations, the message is stored in a message database managed by the network. For instance, a message can be transmitted to both the message database and a user device. Messages can be transmitted between any number of intermediate nodes before being delivered to a user device. Finally, these delivery procedures are intended as an illustrative example—other delivery procedures known in the art can be used to deliver text messages to users in conjunction with the secure messaging procedures of FIGS. 3 and 4.

Figure 5:
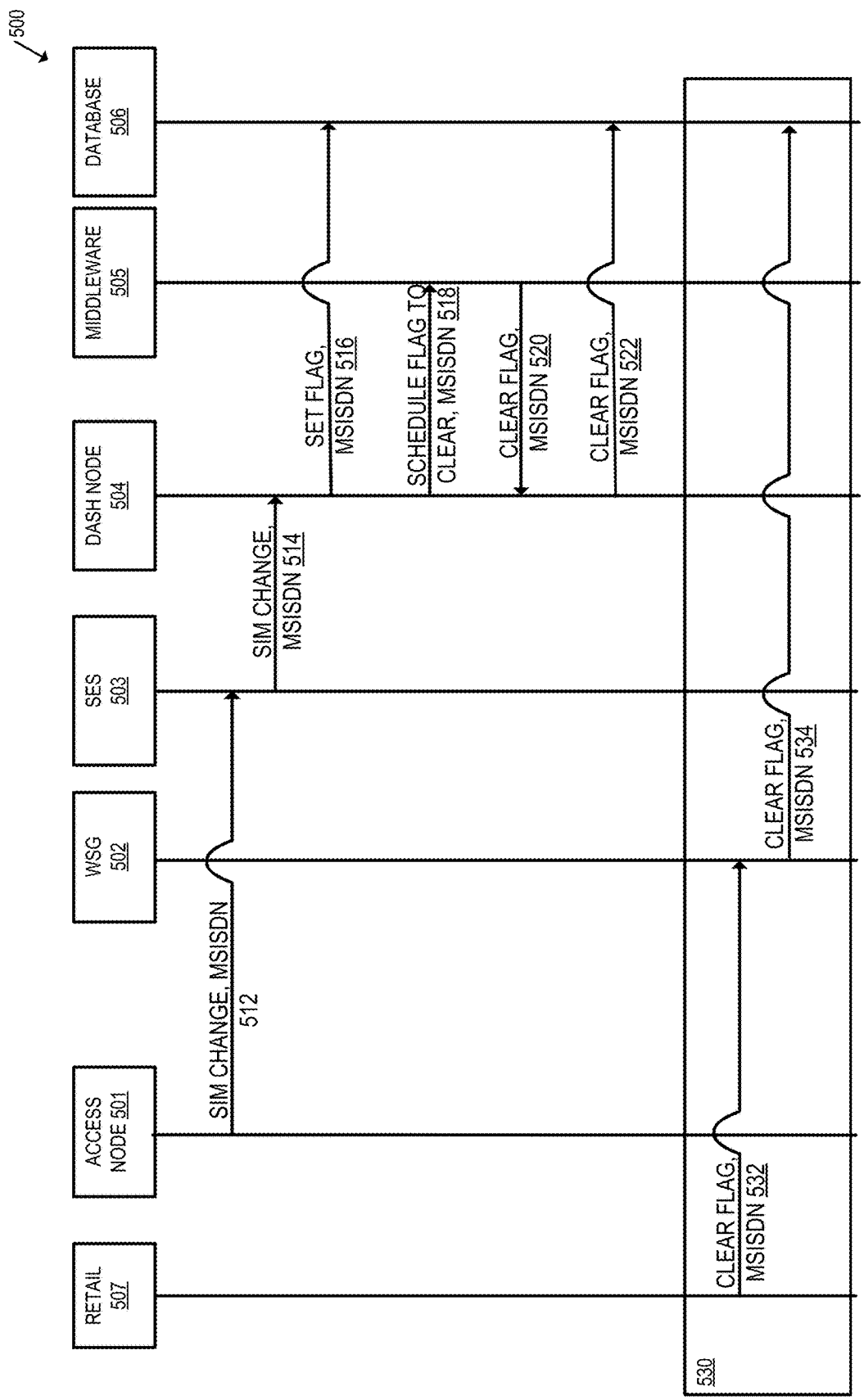
FIG. 5 is a flow diagram that illustrates another signaling process following a SIM change within a network.
Figure 6A:
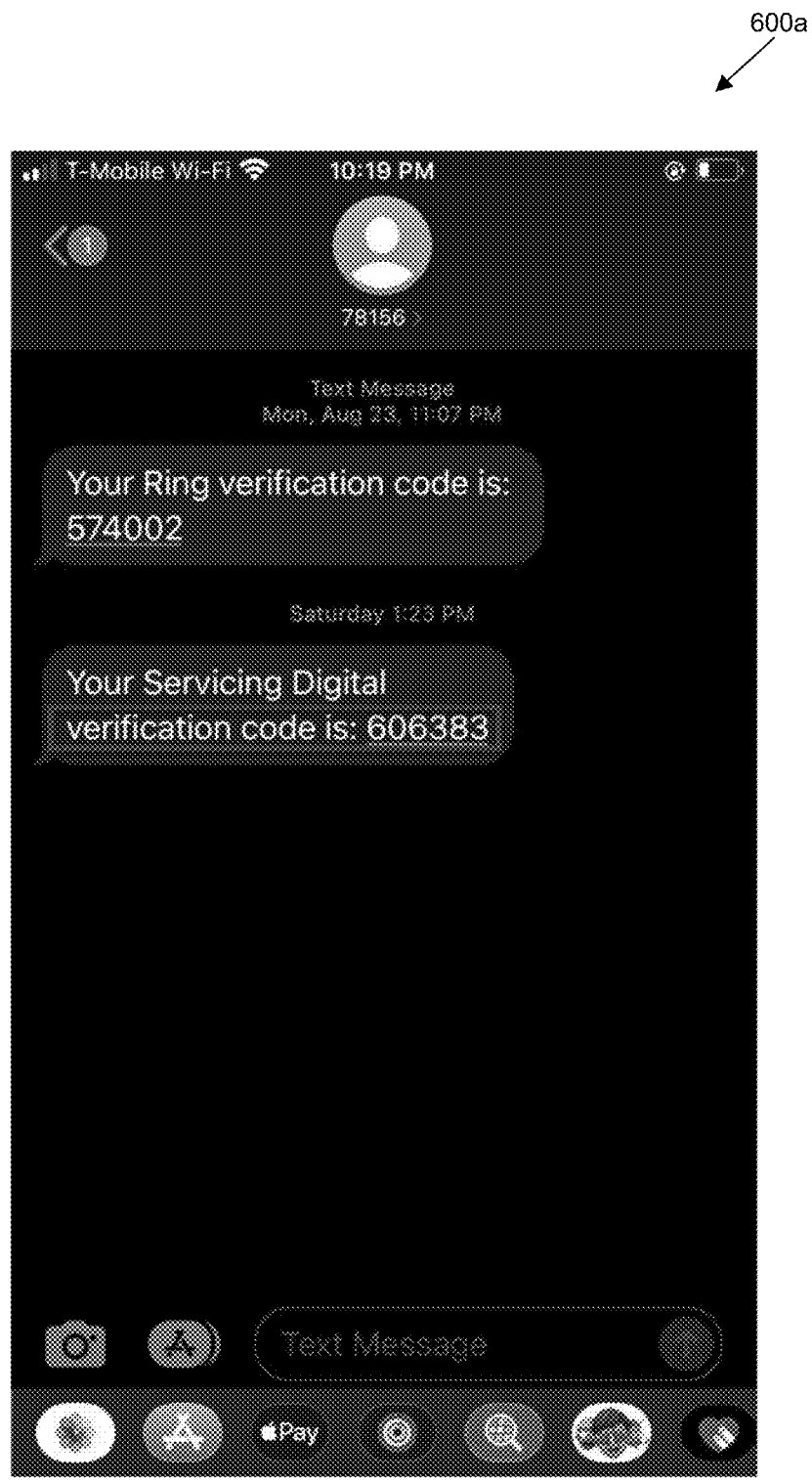
FIGS. 6A-E illustrate example messages that include OTPs.
Figure 6B:
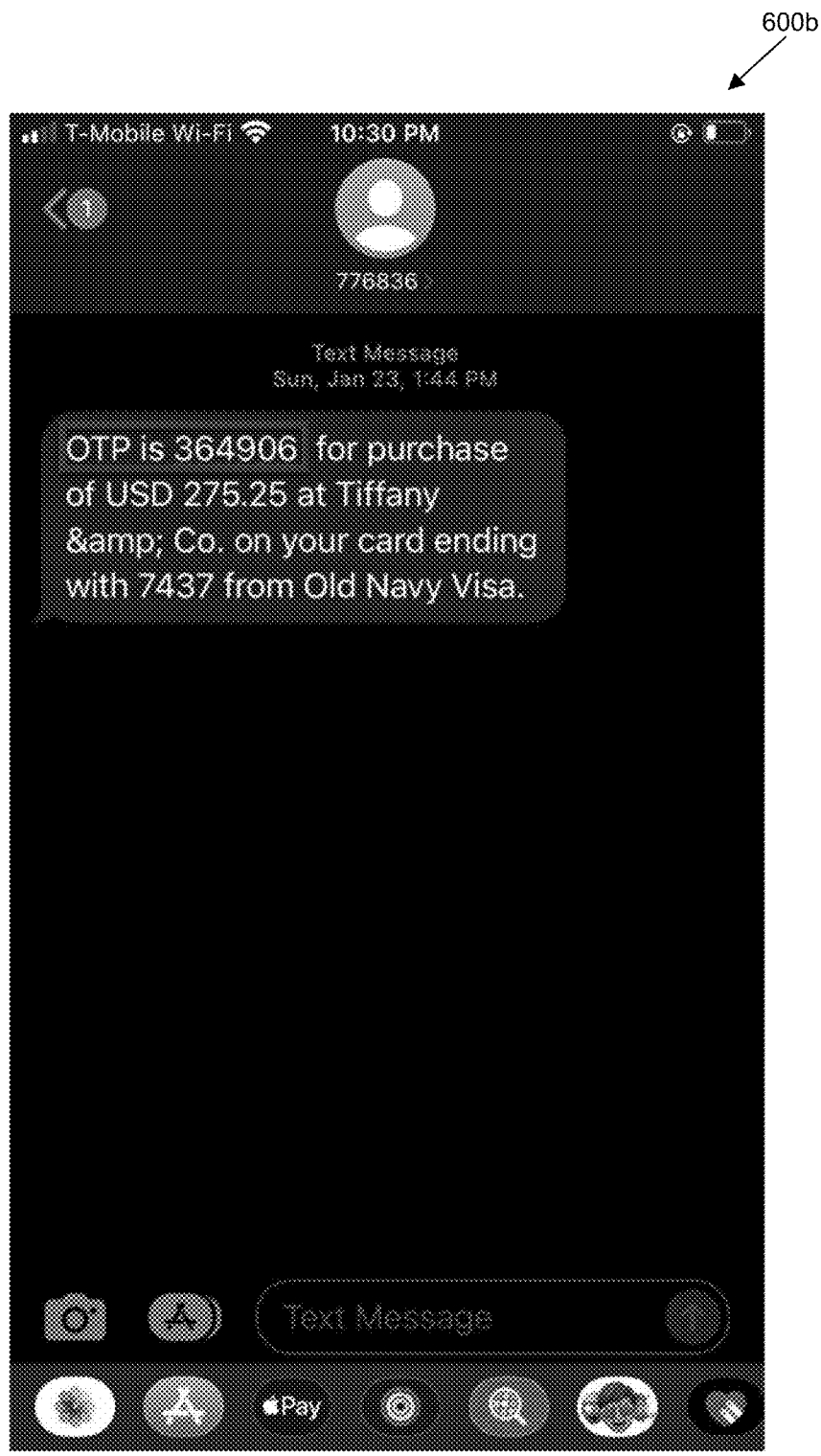
Figure 6C:
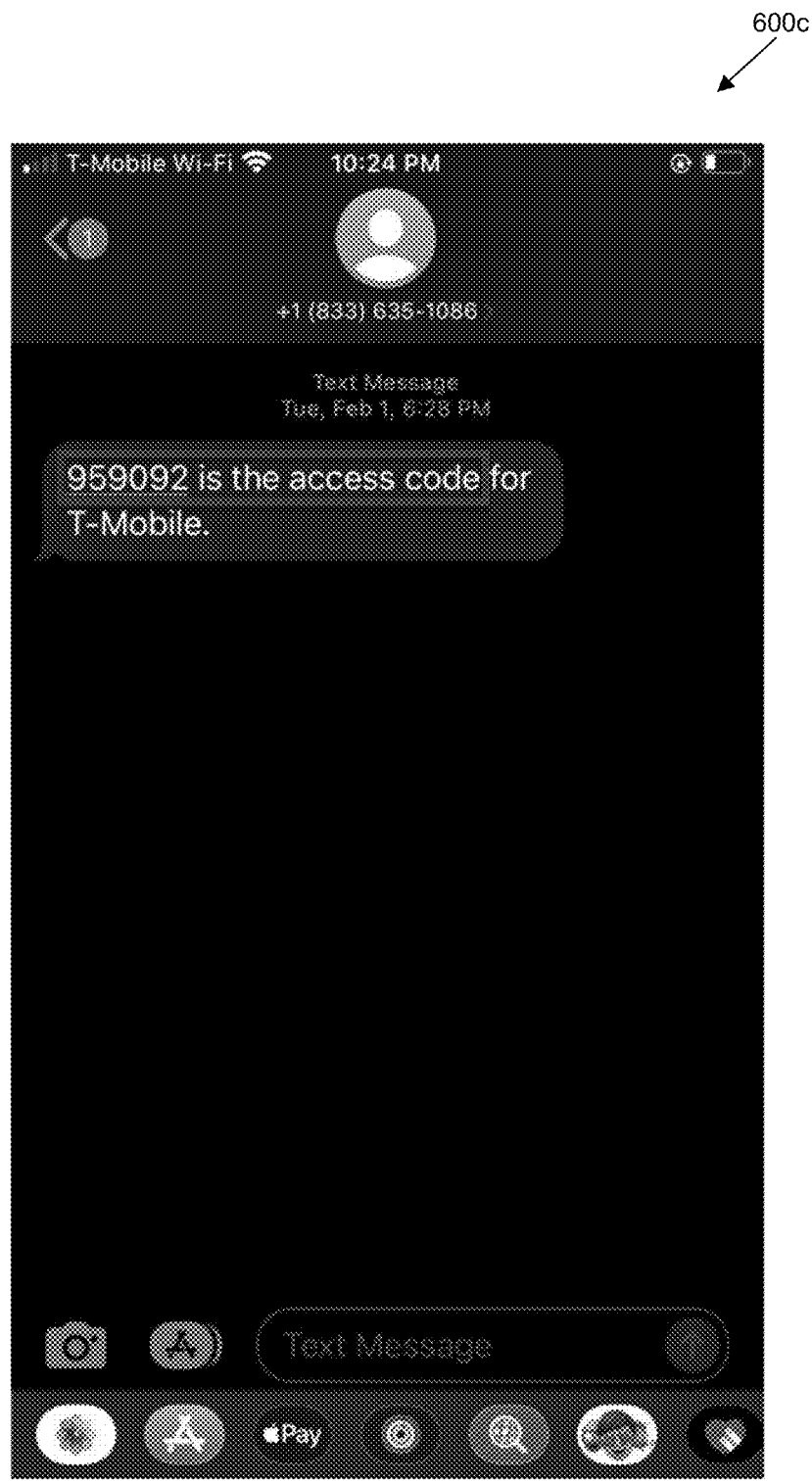
Figure 6D:
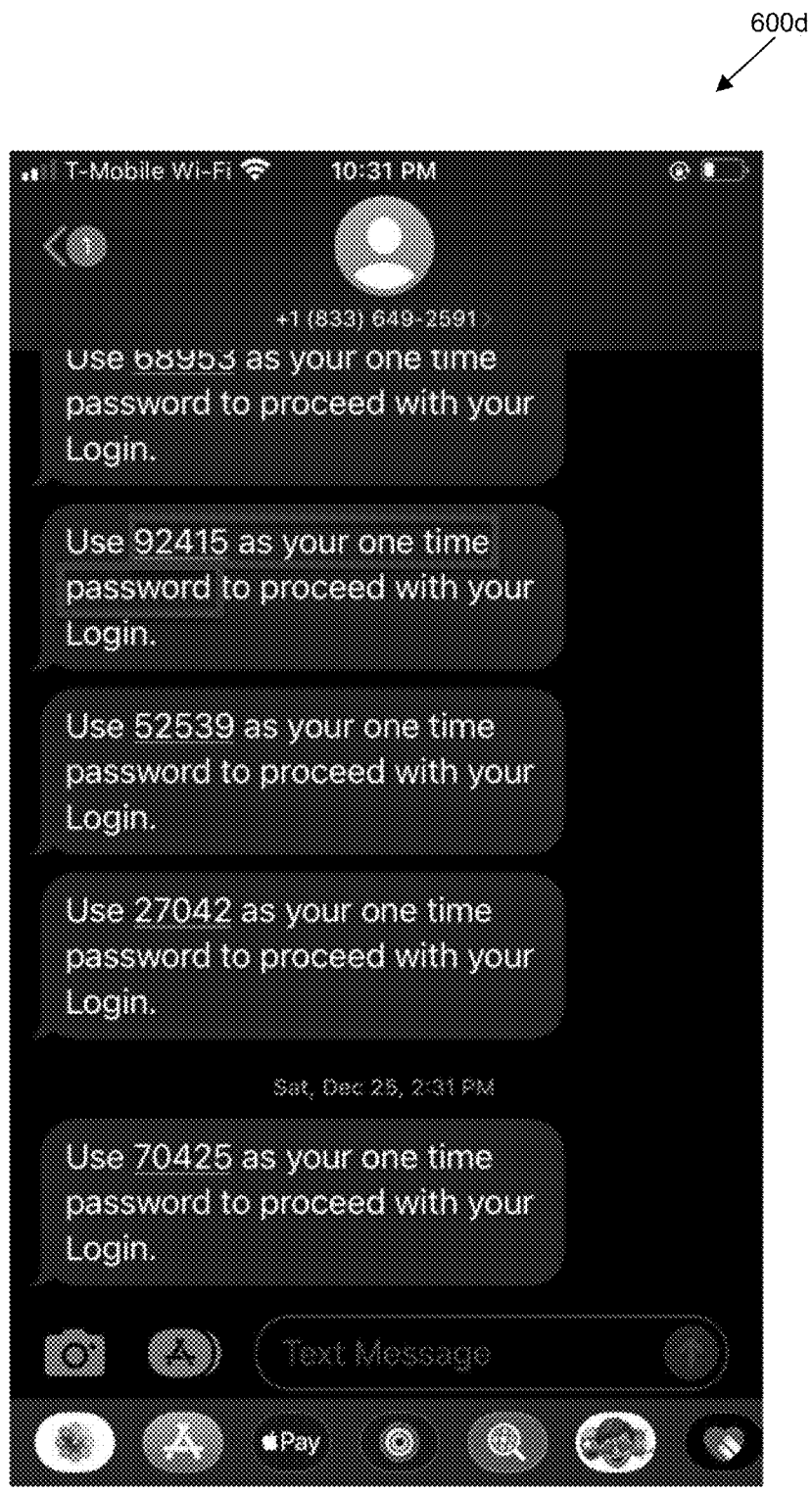
Figure 6E:
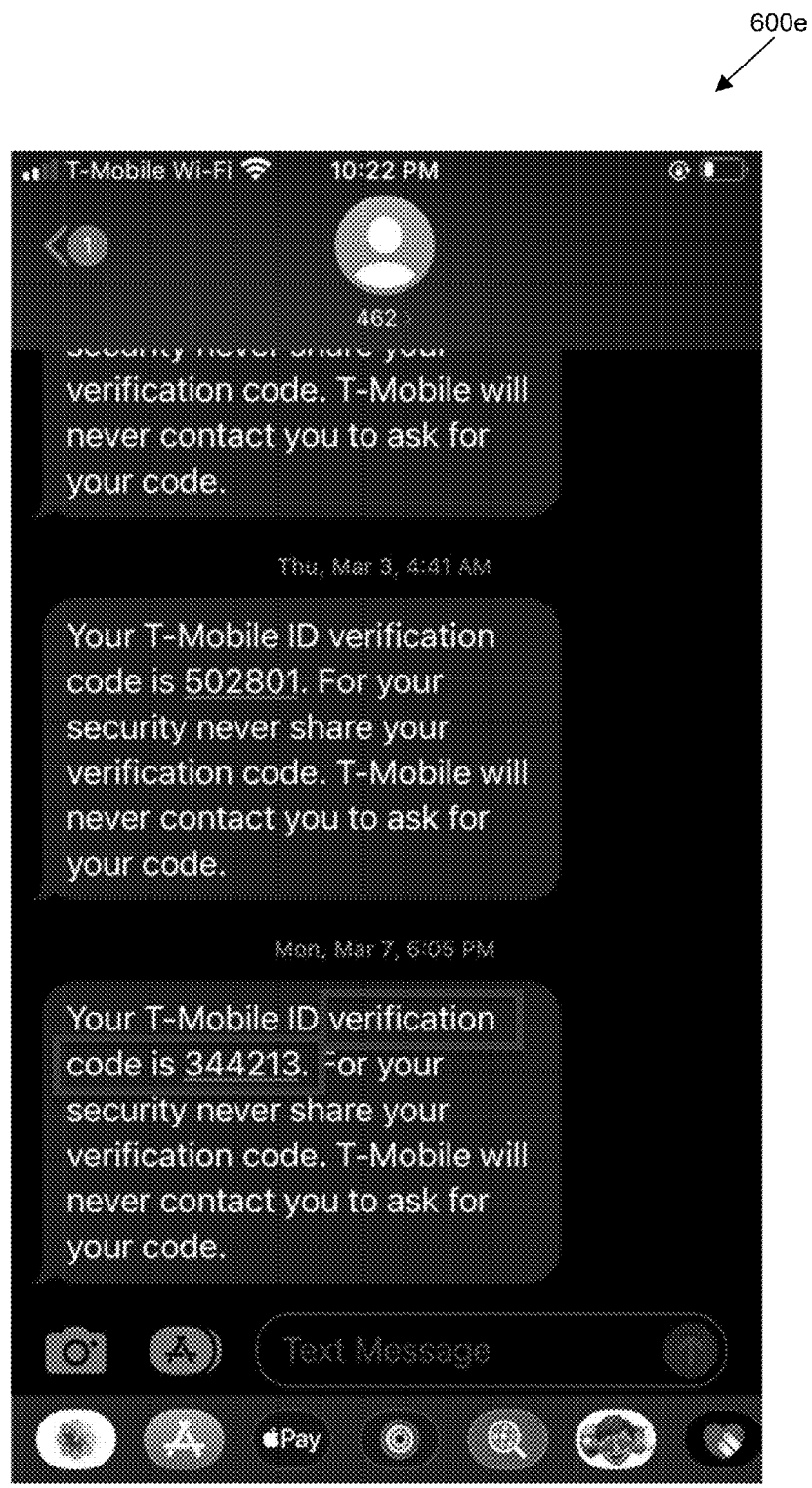

FIG. 5 is a flow diagram that illustrates a signaling process 500 following a SIM change within a network. For example, the process 500 can be used to set the flag that is requested at step 314 of FIG. 3. The process 500 can be used after a SIM change has been implemented, as an alternative to the process 400 of FIG. 4.

At 512, a first message is sent from an access node 501 to a SES node 503. The access node 501 can be a Network Access Point (NAP). The first message identifies a phone number and indicates that a SIM change has occurred for that phone number. For example, the phone number can be a MSISDN. The first message can also include identifiers, such as an international mobile subscriber identity (IMSI). During a SIM change, the IMSI associated with a user account can change when the MSISDN is ported to a new SIM, e.g., a new SIM card. The first message can include the new IMSI or the previous IMSI.

At 514, the SES node 503 transmits a second message that indicates the SIM change has occurred to a DASH node 504. For example, transmitting the second message can include forwarding the first message received at 512 to the DASH node 504.

At 516, the DASH node 504 transmits a third message to a database 506. The database 506 can be the same as database 306 of FIG. 3. The third message indicates to the database 506 to set a flag associated with the phone number identified in the first message of 512 and 514. When the database 506 receives the third message, the database 506 is triggered to automatically set the flag associated with the phone number.

At 518, the DASH node 503 transmits a fourth message associated with the phone number to a middleware element 505. The middleware element 505 executes software that helps to manage communications within the network. For example, the fourth message schedules the middleware element to automatically transmit a fifth message associated with the phone number a predetermined period of time after receiving the fourth message at 518. The fourth message can be transmitted at 518 at approximately the same time as the third message is transmitted to the database 506 at 516.

At 520, after the predetermined period of time, the fifth message is transmitted from the middleware element 505 to the DASH node 504. The fifth message indicates to the DASH node 504 that the flag set in the database 506 should be cleared. Then when the DASH node 504 receives the fifth message, at 522, the DASH node transmits a sixth message associated with the phone number to the database 506. When the sixth message is received at the database 506, the flag associated with the phone number is cleared from the database 506.

The messaging framework described by the process 500 configures a flag in the database 506 to expire at a set time based on the time scheduled by the fourth message transmitted to the middleware element 505 at 518. When the flag setting process 500 is implemented for the flag used in the process 300 of FIG. 3, this enables the network to temporarily block messages classified as "secure" from being transmitted to devices with new SIMs.

Preferably, the time period is configured between approximately 4 to 48 hours. Expiring the flag after a shorter time period can be insufficient to prevent some SIM swap fraud from occurring, while expiring the flag for a longer period of time can prevent users who perform legitimate SIM changes from accessing their accounts for too long. The preferred time range is long enough to prevent SIM swaps, while not being too long as to negatively impact normal communications. In some implementations, the configured time period can be less than about one hour, about 1 to 4 hours, about 4 to 6 hours, about 6 to 12 hours, about 12 to 24 hours, about 24 to 36 hours, about 36 to 48 hours, or greater than about 48 hours.

In some implementations, the process 500 includes a manual override procedure 530. The manual override procedure 530 can be used by a network user or third party to clear the flag in the database 506 before the flag is scheduled to expire at 522. The override procedure 530 is similar to the override procedure 430 of FIG. 4.

At 532, a message to clear the flag is transmitted from a retail node 507 to a WSG node 502. In some implementations, the retail node is accessed by a customer service representative, such as in a call center or retail store associated with the network provider. The WSG node 502 is a gateway configured to receive messages from the retail node 507 and transmit those messages into the network. At 534, the message to clear the flag received at 532 is transmitted to the database 506, which then triggers the database 506 to clear the flag. In some implementations, similar to the procedure 430 of FIG. 4, the manual override procedure 530 is not present or disabled in order to improve security.

FIGS. 6A-E illustrate example messages that include OTPs. Messages 600*a-e* are transmitted as part of multi-factor authentication processes associated with various services. By implementing the techniques described in this disclosure, the network can be configured to prevent such messages with OTPs from being transmitted to malicious parties running a SIM swap scam.

As shown, messages 600*a-e* include one or more OTPs. The OTPs are identified by parsing the text of the messages 600*a-e* and analyzing the text. For instance, the OTPs can be identified by a keyword-based approach or by a machine learning algorithm, as described earlier. As shown, the messages 600*a-e* include words such as "verification," "code,", "OTP," and "password" in proximity to a four to six-digit number. The messages 600*a-e* are associated with phone numbers, which variously include 5 and 6-digit short codes and 10-digit long codes. The phone number of message 600*e* is a 3-digit short code, which can be used by a network provider, such as for network alerts or customer service interactions.

Computer System

Figure 7:
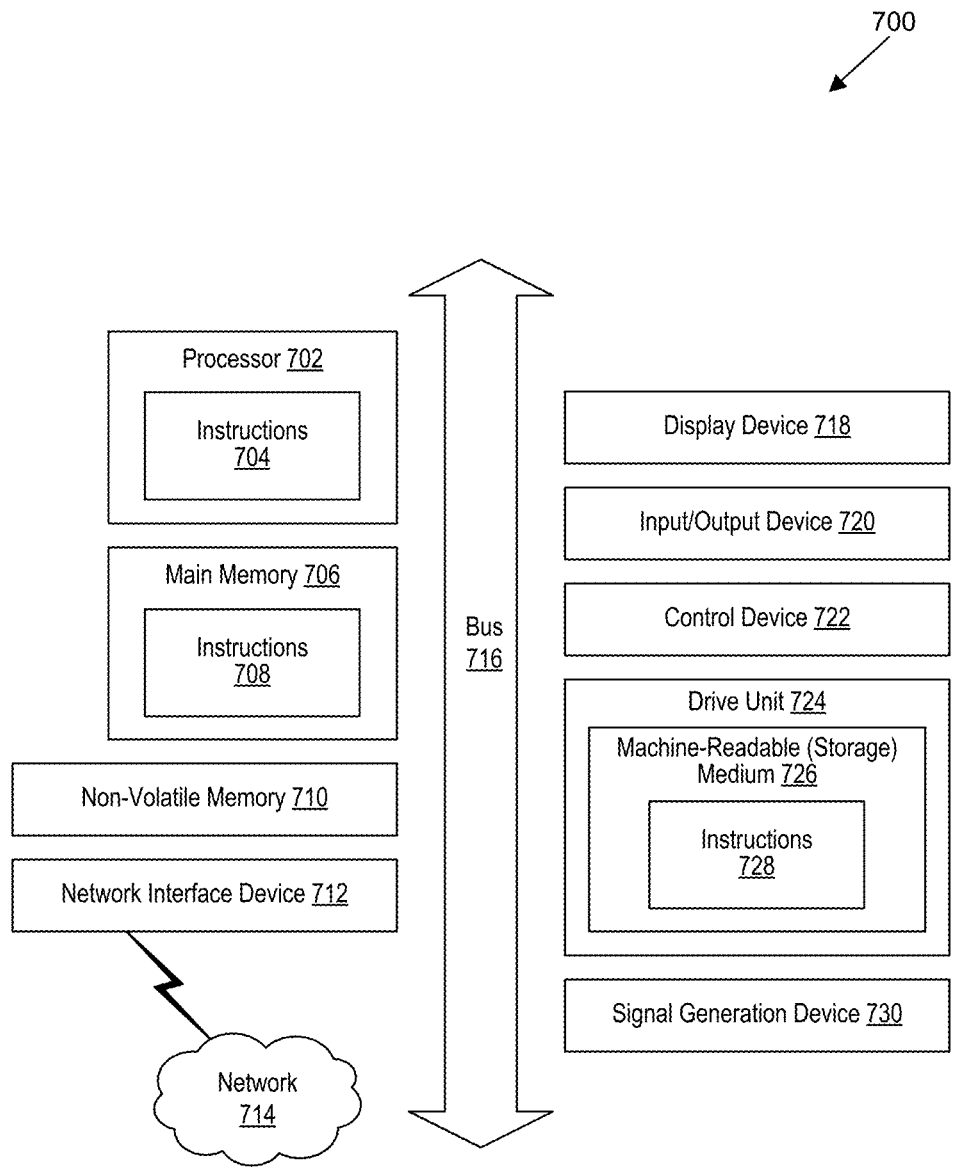
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs").

The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A telecommunications system configured to prevent delivery of a message containing a one-time password (OTP) based on results of an analysis taken in response to an indication of a flag, the telecommunications system comprising:
   a database configured to store a flag associated with an identification number of a user device,
      wherein the flag is associated with a subscriber identity module (SIM) change associated with the identification number, and
      wherein the flag, when set, expires after a predetermined amount of time;
   a first network node including a processor and a memory storing instructions, execution of which by the processor causes the first network node to:
      detect the SIM change associated with the identification number, and
      in response to a determination that the SIM change is associated with a risk score that exceeds a lower threshold value and does not exceed an upper threshold value, trigger a procedure that causes the flag to be set in the database; and
   a second network node including a processor and a memory storing instructions, execution of which by the processor causes the second network node to:
      receive a first text message associated with the identification number configured for delivery to the user device;
      send, to the database and in response to receiving the first text message, a request for an indication of the flag associated with the identification number;
      based on the indication that the flag has been set, cause an analysis of text of the first text message to determine if the first text message includes an OTP;
      based on a first indication that the first text message includes an OTP, block delivery of the first text message to the user device,
         wherein the first indication is determined based on the analysis of text of the first text message;
      receive, at the second network node, a second text message associated with the identification number configured for delivery to the user device;
      based on a second indication that the second text message does not include an OTP, deliver the second text message to the user device;
      receive, from a user, a message to clear the flag in the database; and
      send, to the database, a request to clear the flag,
         wherein the request causes the flag to be cleared before completion of the predetermined amount of time.

2. The system of claim 1, wherein, in addition to the first text message being blocked, the network node is further caused to:
   deliver, to the user device, a replacement text message that indicates the first text message has been blocked.

3. The system of claim 1, wherein the predetermined amount of time is determined based on a risk score associated with the SIM change, and wherein the predetermined amount of time is about 1 to 4 hours, 4 to 6 hours, 6 to 12 hours, 12 to 24 hours, 24 to 36 hours, or 36 to 48 hours.

4. The system of claim 1, wherein the network node includes a short message service center (SMSC), and wherein the network node is further caused to:
   receive the first indication that the first text message includes the OTP from another network node.

5. The system of claim 1, further comprising:
   a service delivery gateway (SDG) configured to receive application to person (A2P) messages, wherein the first text message is received at the network node from the SDG.

6. The system of claim 1, further comprising:
   a second network node configured to:
      detect the SIM change associated with the identification number, and
      in response to a determination that the SIM change is associated with a risk score that exceeds a threshold value, trigger a procedure that causes the flag to be set in the database.

7. The system of claim 6, further comprising:
   a third network node configured to determine the risk score based on contextual information associated with the SIM change,
   wherein the second network node is configured to receive an indication of the risk score from the third network node.

8. The system of claim 1, wherein the first indication that the first text message includes the OTP is determined based on an analysis of text of the first text message using an artificial intelligence model.

9. A computer-readable storage medium, excluding transitory signals and carrying instructions, which, when executed by at least one data processor of a system, cause the system to:
   set, in a database, a flag associated with an identification number of a user device,
      wherein the flag is associated with a subscriber identity module (SIM) swap associated with the identification number,
      wherein the flag, when set, expires after a predetermined amount of time,
      wherein setting the flag comprises:
         determining a risk score associated with the SIM swap associated with the identification number, and
         setting the flag in response to a determination that the risk score exceeds a lower threshold value and does not exceed an upper threshold value;
   receive, at a network node, a text message associated with the identification number;
   send, from the network node and in response to receiving the text message, a request for an indication of the flag associated with the identification number;
   receive, at the network node, the indication that the flag is set in the database;
   classify the text message as secure, wherein the classification is based on an analysis of text of the text message; and based on an indication that the text message is classified as secure, block delivery of the text message to the user device;

receive, from a user, a message to clear the flag in the database; and clear the flag in the database, wherein the flag is cleared before completion of the predetermined amount of time.

10. The computer-readable storage medium of claim 9, wherein the text message includes a one-time password (OTP) associated with a multi-factor authentication process.

11. The computer-readable storage medium of claim 9, wherein, in addition to the text message being blocked, the system is further caused to:

deliver, to the user device, a replacement text message that indicates the text message has been blocked.

12. The computer-readable storage medium of claim 9, wherein the predetermined amount of time is determined in as a function of a risk score associated with the SIM swap.

13. The computer-readable storage medium of claim 9, wherein the network node includes a short message service center (SMSC), and wherein the network node is further caused to:

receive the indication that the text message is classified as secure from another network node.

14. The computer-readable storage medium of claim 9, wherein the text message is a short message service (SMS) message, and wherein the SMS message is associated with a short code or a 10-digit long code.

15. The computer-readable storage medium of claim 9, wherein the text message is received at the network node from a service delivery gateway (SDG) configured to receive application to peer (A2P) messaging.

16. The computer-readable storage medium of claim 9, wherein the classification of the text message as secure is based on an analysis of text of the text message using an artificial intelligence model.

17. A telecommunications apparatus comprising:

at least one hardware processor; and at least one non-transitory memory storing instructions, which, when executed by the at least one hardware processor, causes the apparatus to:

receive a text message from a gateway configured to receive application-to-person (A2P) messaging, the text message associated with a destination number;

send, to a database and in response to receiving the text message, a request for an indication that a flag is set in the database, wherein the flag is associated with a subscriber identity module (SIM) swap associated with the destination number, wherein the flag, when set, expires after a predetermined amount of time, wherein the setting the flag in the database comprises:

determining a risk score associated with the SIM swap associated with the destination number, and setting the flag in response to a determination that the risk score exceeds a lower threshold and does not exceed an upper threshold;

receive the indication that the flag is set in the database;

determine the text message includes a one-time password (OTP), wherein the determination comprises analyzing text of the text message;

based on determining the text message includes the OTP, deliver a replacement text message different from the text message to a device associated with the destination number, without delivering the text message to the destination number, receive, from a user, a message to clear the flag in the database; and clear the flag in the database, wherein the flag is cleared before completion of the predetermined amount of time.

18. The apparatus of claim 17, wherein the destination number is a Mobile Subscriber Integrated Services Digital Network (MSISDN) number.

19. The apparatus of claim 17, wherein the database is configured to remove the flag after a predetermined period of time has expired.

20. The apparatus of claim 17, wherein the determination that the text message includes the OTP comprises analyzing text of the text message using an artificial intelligence model.

* * * * *